(12) United States Patent
Soljacic et al.

(10) Patent No.: US 7,027,681 B2
(45) Date of Patent: Apr. 11, 2006

(54) USING OPTICAL SOLITONS TO INCREASE FIGURE-OF-MERIT OF LASER BEAM DEFLECTION DEVICES

(75) Inventors: Marin Soljacic, Somerville, MA (US); Mordechai Segev, Haifa (IL); Chiyan Luo, West Roxbury, MA (US); John D. Joannopoulos, Belmont, MA (US)

(73) Assignees: Massachusetts Institute of Technology, Cambridge, MA (US); Technion Research and Development Foundation, Ltd., Haifa (IL)

( * ) Notice: Subject to any disclaimer, the term of this patent is extended or adjusted under 35 U.S.C. 154(b) by 356 days.

(21) Appl. No.: 10/630,455

(22) Filed: Jul. 30, 2003

(65) Prior Publication Data

US 2005/0063427 A1    Mar. 24, 2005

Related U.S. Application Data

(60) Provisional application No. 60/399,724, filed on Jul. 30, 2002.

(51) Int. Cl.
    *G02B 6/35*         (2006.01)

(52) U.S. Cl. .......................... 385/16; 385/122; 385/129

(58) Field of Classification Search ............... None
    See application file for complete search history.

(56) References Cited

U.S. PATENT DOCUMENTS

| 5,469,525 A | 11/1995 | Luther-Davies et al. |
| 5,651,079 A * | 7/1997 | Goorjian ................ 385/16 |
| 5,963,683 A * | 10/1999 | Goorjian ................ 385/16 |

FOREIGN PATENT DOCUMENTS

| JP | 56098079 | 8/1981 |
| JP | 60121423 | 6/1985 |

OTHER PUBLICATIONS

"Dynamic Elrectonically controlled angle steering of spatial solitons in AlGaAs slab waveguides," Friedrich et al. *Optics Letters*. Sep. 1998. Col. 23, No. 18.
"Diffractionless Propagation in Low Loss LiNbO$_3$ Channel Waveguide Arrays," Iwanow et al. *Conference on Lasers and Electro-Optics. (CLEO 2002). Technical Digest*. May 2002.
"Design of an All-Optical Wavelength Router Based on Spatial Solitons," Chiaraluce et al. *Journal of Lightwave Technology*. Sep. 1999. vol. 17, No. 9.

(Continued)

*Primary Examiner*—John D. Lee
*Assistant Examiner*—Kevin S. Wood
(74) *Attorney, Agent, or Firm*—Gauthier & Connors LLP

(57) ABSTRACT

A device for bending a laser beam is provided. The device includes a beam deflection device that produces the beam having a selected number of addressable points. A soliton forming mechanism is positioned at the output of the beam deflection device so it receives the beam and increases the number of addressable points by a certain magnitude.

14 Claims, 3 Drawing Sheets

OTHER PUBLICATIONS

"Photonic-Crystal Slow-Light Enhancement of Non-Linear Phase Sensitivity," Soljacic et al. *J. Opt. Soc. Am.* Sep. 2002. vol. 19, No. 9.

"Self-Trapping of 'Necklace' Beams in Self-Focusing Kerr Media," Soljacic et al. *Physical Review Letters*. Nov. 1998. vol. 81, No. 22.

"Negative Refraction Makes a Perfect Lens," Pendry. *Physical Review Letters*. Oct. 2000. vol. 85, No. 18.

"Superprism Phenomena in Photonic Crystals," Kosaka et al. *Rapid Communications, Physical Review B*. Oct. 1998. vol. 58, No. 16.

"Dynamic, Electronically Controlled Angle Steering of Spatial Solitons in AlGaAs Slab Waveguides," Friedrich et al. *Optics Letters*. vol. 23, No. 18.

"Signal Readdressing by Steering of Spatial Solitons in Bulk Nematic Liquid Crystals," Peccianti et al. *Optics Letters*. vol. 26, No. 21.

* cited by examiner

USING OPTICAL SOLITONS TO INCREASE FIGURE-OF-MERIT OF LASER BEAM DEFLECTION DEVICES

PRIORITY INFORMATION

This application claims priority from provisional application Ser. No. 60/399,724 filed Jul. 30, 2002, which is incorporated herein by reference in its entirety.

This invention was made with government support under Grant No. DMR9808941 awarded by NSF. The government has certain rights in the invention.

BACKGROUND OF THE INVENTION

The invention relates to the field of laser beam deflection devices, and in particular to the use of solitons to increase figure-of-merit of laser beam deflection devices.

The most common way of achieving fast light deflection is by using micro-electro-mechanical (MEMS), acousto-optic, and electro-optic devices.

A MEMS device is essentially a tiny mirror whose direction can be changed by applying electrical stimuli to it. Due to the nature of its operation, the number of resolvable points is almost arbitrary. However, most MEMS devices used today have a response time of the order of 1 ms. Operational times of the order 1 μs have been demonstrated. There have also been proposals on how one might be able to achieve operational times perhaps as fast as 20 ns in MEMS devices that use interference rather than reflection, however, such devices have yet to be demonstrated, and what their number of resolvable points will ultimately be is not clear at this point.

Acousto-optic devices explore deflection of light by reflection from a grating, which is dynamically "written" into the material of propagation by a sound-wave. Due to the nature of their operation, the number of the resolvable points can be large, and they can be fast (up to the order 1 ns). However, the faster they are, the smaller the number of resolvable points. As one approaches the speeds of 1 ns, the number of resolvable points decreases to only a few. Furthermore, the angle of deflection is fairly sensitive to the wavelength of the light being deflected. Consequently, these devices can typically be designed to have the desired performance only within a fairly limited bandwidth.

In electro-optic devices, deflection of light is accomplished through electro-optic effect. Through the electro-optic effect, a strong electrical DC field applied to a material modifies the index of refraction of the material. If this modification is different in different parts of the material, different parts of the beam propagating through such a material can accumulate different phase-shifts. If the accumulated phase shift varies uniformly across the beam, the wave-front gets bent by an angle as shown in the example in FIG. 1.

In particular, FIG. 1 shows a panel 2 having an external DC electric field that is not applied. The beam exits the device along the same direction it entered the device. In panel 4, an external electric DC field is applied to the material. The gradient of the field is uniform and the field varies from zero (at the bottom of the material) to some maximum value (at the top of the material). Due to the electro-optic effect, the index of refraction is larger in the upper part of the material than in the lower part. Consequently, the part of the beam that travels in the upper part accumulates more phase shift than the part traveling in the lower part. As a result, the beam is deflected upwards. Note that panels 2 and 4 have a length L and width D.

Since a DC field can be turned on and off fairly rapidly, electro-optic devices can be ultra-fast; speeds of operation faster than 1 ns are not unusual. Consequently, they currently present the only feasible solution that can be used to operate at ultra-fast speeds. Unfortunately, there are some physical limitations, to be explained below, that limit the number of resolvable points of such a device to only a few.

SUMMARY OF THE INVENTION

According to one aspect of the invention, there is provided a device for bending a beam. The device includes a beam deflection device that produces the beam having a selected number of addressable points. A soliton forming mechanism is positioned at the output of the beam deflection device so it receives the beam and increases the number of addressable points by a certain magnitude.

According to another aspect of the invention, there is provided a method of bending a beam. The method includes producing the beam having a selected number of addressable points with a beam deflection device. Also, the method includes positioning a soliton forming mechanism at the output of the beam deflection device so it receives the beam and increases the number of addressable points by a certain magnitude.

DETAILED DESCRIPTION OF THE INVENTION

Figure 1:
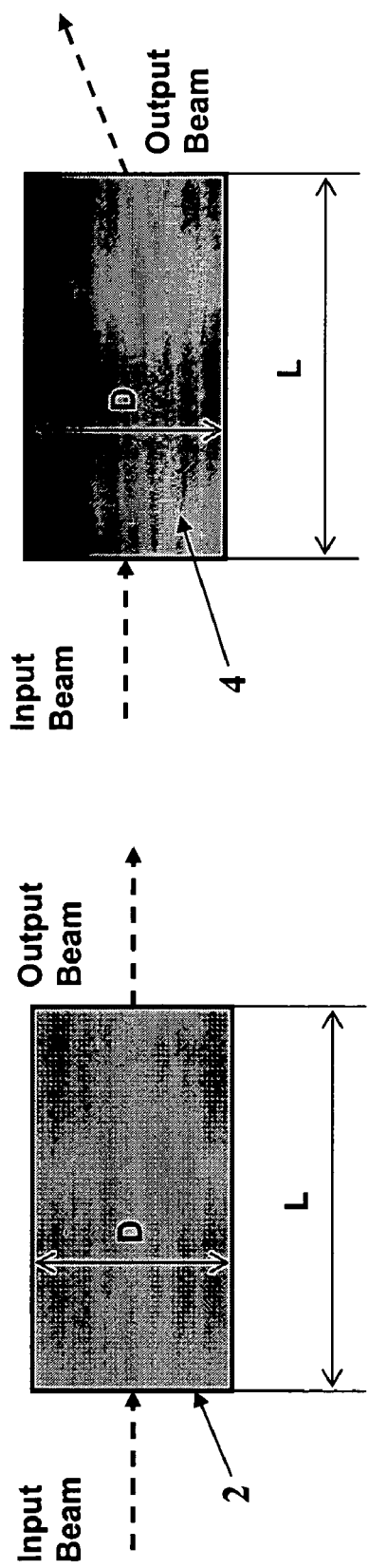
FIG. 1 is a schematic block diagram illustrating bending of light using electro-optic effect.

The invention uses a principle that increases the number of resolvable points of any laser-beam deflection device by one, two, or more orders of magnitude. The principle will be an enabling technology for ultra-fast 1-by-N switching, where N is large. It will also be an enabling technology for 3D-laser-TV. Furthermore, the invention will lead to important improvements in many other applications.

Fast deflection of a beam of directed laser light by an arbitrary angle is important for many very different applications (telecommunications, imaging, etc.). The figure of merit of a device that performs such a function is given by the number of the resolvable (addressable) points at the output of the device. With the currently available technologies, there are significant trade-offs between the speed of the device and its figure of merit. For example, for some applications it is highly desirable to have speeds on the order of 1 ns. Unfortunately, devices that can operate at such high speeds can typically resolve only of the order of 10 points. In the current invention, optical solitons are used to increase the figure of merit of any beam-deflection device by many orders of magnitude.

As discussed hereinbefore, the figure of merit of a beam-deflection device is given by the number of the addressable points at the output of the device. One might think that the relevant figure of merit of such a device should be the maximum angle $\theta_{DEF}$ by which the device can deflect a beam. However, the size of this angle is actually irrelevant since it can always be amplified with a lens. Unfortunately, when a beam goes through a lens, its far-field divergence angle $\theta_{BEAM}$ gets amplified by the same amount. Consequently, it is known in the art that the relevant figure of merit for a beam-deflection device is given by the ratio $N_{FOM}=\theta_{DEF}/\theta_{BEAM}$, which is also the number of resolvable (addressable) points that can be addressed by this device.

There are several physical reasons why the number of resolvable points of an electro-optic beam-deflection device is limited to only a few. First of all, assume that the "waist" width of the beam is given by D. The maximum useful length L of the device is roughly given by one diffraction length, $L \approx L_D = \pi D^2/(2\lambda)$, where $\lambda$ is the carrier wavelength in the material. In this case, the deflection angle is given by $\theta_{DEF} = \lambda \Delta\phi/(2\pi D)$, where $\Delta\phi$ is the accumulated phase difference between the upper and the lower part of the beam. The phase difference $\Delta\phi$ is given by $\Delta\phi \approx 2\pi\delta n L_D/(\lambda n)$, where n is the index of refraction of the material, while $\delta n$ is the difference in the indices of refraction seen by the upper and the lower parts of the beam.

Consequently, $\theta_{DEF} \approx \delta n L_D/(Dn)$ and $\theta_{BEAM} = D/2L_D$. Therefore, $N_{FOM} = \theta_{DEF}/\theta_{BEAM} \approx \pi \delta n L_D/(n\lambda)$. In any particular physical implementation, $N_{FOM}$ can differ from this expression by only a geometrical factor of the order of a few. However, since the electro-optic effect is limited to $\delta n \leq 0.001$, assuming the length of the active material to be 10 mm (using significantly larger active materials is not practical), carrier wavelength in air is 1.55 μm, and n=3, there are a total of only 7 resolvable points.

Using similar scaling arguments one can also show that very fast (<1 ns) acousto-optic devices can also produce only a few resolvable points.

Note that one can show that the number of the resolvable points cannot be increased appreciably by placing any linear device (like a lens, or a super-prism) at the output of the beam-deflection device.

Figure 2:
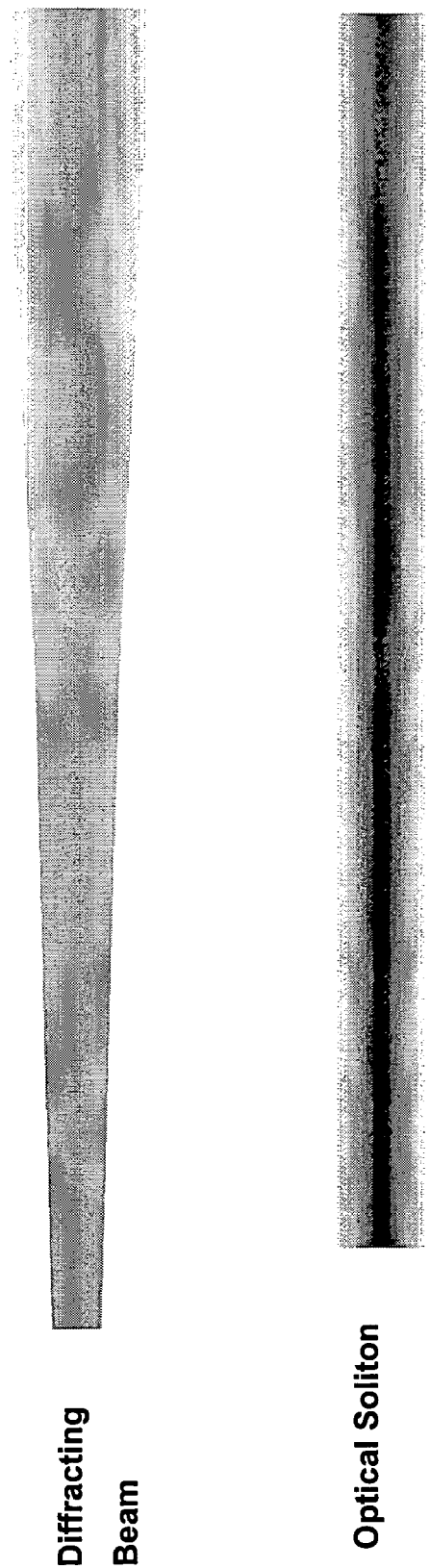
FIG. 2 is a schematic illustrating a beam propagating in a linear media (top panel); and also in soliton-forming media (bottom panel)

Finite width laser beam spreads (diffracts) as it propagates in any linear media. However, if the material is non-linear, under proper conditions a spatial optical soliton can form, and the beam propagates through the material without changing its shape as it propagates. Intuitively, one can think of a spatial soliton as generating its own self-induced waveguide as it propagates, as illustrated in the bottom panel of FIG. 2; through non-linearity, the local index of refraction increases at the places where the intensity is high. This non-linearly induced waveguide then in turn guides the beam, which created the waveguide in the first place. In quite a few cases the self-guided creatures created this way are stable to small perturbations, so they can propagate for long distances, while perfectly preserving their initial shape. Note that top panel in FIG. 2 demonstrates a diffracting beam (in a linear medium) that does not retain its shape while propagating.

Figures 3A, 3B:
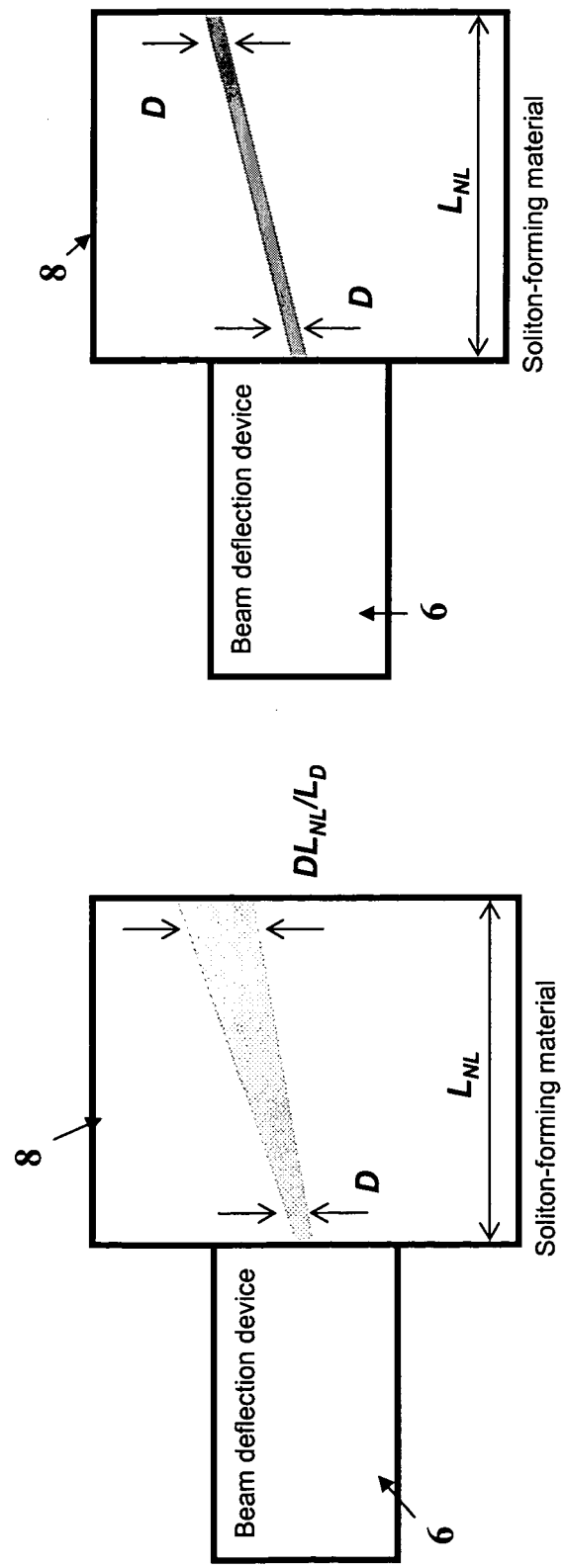
FIG. 3A is a schematic demonstrating a situation when a soliton is not formed (linear propagation)
FIG. 3B is a schematic demonstrating when a soliton is formed (nonlinear propagation).

A critical aspect of the invention is to place a non-linear medium 8 at the output of a beam-deflection device 6, as shown in FIGS. 3A–3B. Suppose that the parameters of the non-linear media 8, and the parameters of the beams exiting the beam-deflection device 6 are such that any beam entering the non-linear media 8 forms a soliton. In this case the final $\theta_{DEF}$ is not influenced. Nevertheless, the number of the resolvable points at the output of the combined device is now given by $N_{FOM}*(L_{NL}/L_D)$, where $L_{NL}$ is the length of the non-linear material, and $L_D$ is the diffraction length in the non-linear material when the non-linearity is "turned off".

To see this, note that no matter whether the non-linearity is turned on or off, the "addressable" width at the output of the non-linear material is given by $\theta_{DEF}*L_{NL}$. When the non-linearity is off, as shown in FIG. 3A, the width of the beam at the output of the non-linear material 8 is $D*(L_{NL}/L_D)$, where D is the width of the beam at the input of the non-linear material; the number of the resolvable points is therefore $\theta_{DEF}*L_{NL}/[D*(L_{NL}/L_D)]=\theta_{DEF}/\theta_{BEAM}=N_{FOM}$, as expected. In contrast, when the non-linearity is turned on, as shown in FIG. 3B, the width of the beam at the output of the non-linear material is D, the same as it was at the input. So, when the non-linearity is on, the number of the resolvable points at the output of the non-linear material 8 is $\theta_{DEF}*L_{NL}/D=N_{FOM}*(L_{NL}/L_D)$, as promised.

To appreciate how large this improvement in the number of the addressable points can be, it is useful to put things in a context of a real physical example. For example, the width of the beam is D=5 μm and its carrier wavelength in the non-linear material is $\lambda$=500 nm. In that case the diffraction length is $L_D = \pi D^2/(2\lambda) \approx 75$ μm. If the material is $L_{NL}$=7.5 mm long, placing a non-linear material at the output face of a beam-deflection device increases its number of addressable points by a factor of $L_{NL}/L_D=100$.

However, the invention is perfectly applicable for 3D propagation. Suppose that a beam-deflection device can access a total of $N_{FOM}*N_{FOM}$ points in a plane transverse to the propagation of the initial beam. In that case, a soliton-forming material placed at the output of the beam-deflection device increases the number of the resolvable points by a factor of $(L_{NL}/L_D)*(L_{NL}/L_D)$. As discussed herein, in a readily achievable physical setting this increase can easily be by more than 4 orders of magnitude.

Clearly, the inventive principle that is described is more general than using solitons only; any (even partial) non-linear self-focusing can be made to improve the number of resolvable points, even if we do not have perfect soliton formation.

One might wonder how restrictive are the requirements on implementing the invention. Suppose that a given soliton-forming material is at our disposal. Moreover, suppose that the width of the beam exiting the beam-deflection device and its carrier wavelength are known and fixed. Then, since optical solitons are typically fairly robust creatures, i.e., they are stable to small perturbations, and to small deviations in the initial conditions, one simply needs to pick the peak intensity of the beam to be reasonably close to the soliton-forming intensity. Satisfying this simple requirement should be sufficient to generate a soliton. Furthermore, there are many materials at our disposal in which subsequent small changes in the carrier frequency will not destabilize the soliton, for example, the useful bandwidth of such a system should easily be made to be a few percent, or even more.

Optical solitons have been observed in a wide variety of non-linear media. However, a consideration that immediately comes to one's mind is how large peak intensities does one really need in order to implement the invention. Some optical solitons have been observed with using very small beam intensities, however, in that case, one typically needs to sacrifice with the response time. Since ultra-fast response times (1 ns or faster) are attractive, having to use large intensities presents a limitation to the invention.

Nevertheless, one should be able to drastically reduce the needed power levels if one uses specially designed photonic crystals as the non-linear media. There are two ways how photonic crystals can dramatically reduce the power requirements. The first way is to explore a regime of slow group velocity in photonic crystals; using slow-group velocities has been shown to lead to a decrease of the required operating power of a wide class of non-linear devices by a factor of $(v_G/c)^2$, where $v_G$ is the group velocity, and c is the speed of light in air. Since $v_G/c$ can easily be 1/100, or even 1/1000 in photonic crystals, using a regime of slow group velocity one might be able to save 4–6 orders of magnitude in the needed operational power.

The second way to decrease power requirements by using photonic crystals is the fact that one can operate in the regimes where the diffractive effects are weakened, so one needs smaller non-linear effects in order to balance the diffraction. For an illustrative example how diffractive properties can vary drastically in different regimes inside a photonic crystal.

Photonic crystals should also open opportunities to use many materials that could previously not be used for soliton-formation since solitons are not stable in these materials. Good examples for this are solitons in centro-symmetric Kerr media that are modeled by the (2+1)D cubic non-linear Schrodinger equation:

$$i\frac{\partial \psi}{\partial z} + \frac{1}{2}\nabla^2 \psi + |\psi|^2 \psi = 0, \qquad (1)$$

where z is the propagation direction, and $\psi$ is the slowly varying amplitude of the carrier electric field. This equation is a valid model for a wide variety of non-linear systems in nature. Unfortunately, solitons of this equation are unstable. Nevertheless, if a photonic crystal is made from Kerr media, the terms involving derivatives in this equation can be engineered at will. By choosing the right form of the diffraction term (second term in Eq.(1)), one should have no problem to construct Kerr-media photonic crystals in which optical solitons would be stable.

It is also expected that in some photonic crystals, the required spatial region of index change for soliton formation could be significantly less than that in a uniform medium, and a spatial soliton inside a photonic crystal could have a width as small as on the order of a single wavelength (compared to >20$\lambda$ which is typically necessary for a uniform non-linear medium because of the smallness of the non-linear effects). Therefore, the input/output optical waveguides, the beam-deflection medium, and the proposed soliton-forming medium could in principle be all implemented in a single photonic crystal chip. This would provide reduction in the required over-all device dimension and the additional advantage of straightforward integration with other optical components on the same chip.

Finally, one can also use another technique if the intensity of the signals that need to be deflected is simply too small to create optical solitons in a feasible manner. It is proposed that one can also use an additional "control" beam, of a different carrier frequency (or polarization) whose intensity is much larger (just large enough to create solitons) than the intensity of the signal. Consequently, the control beam can be deflected according to the scheme described herein. The signal beam than simply follows the control beam in its track; for example, the signal beam propagates superimposed on top of the control beam. Inside the beam-deflection device, the beams are deflected by the same angle, although they do not "see" each other. Once inside the non-linear media, the soliton created by the control beam also acts as the waveguide for the signal beam. At the final output of the combined device the control beam is filtered out, and only the signal beam exits the device.

A related idea to the inventive principle is to perform both electro-optical beam-deflection and soliton formation in the same material. Suppose that you have a spatial soliton propagating in z-direction, in a material where the index $n(x,z)=n_0+n_1 x$, where $n_1$ is small. In that case, one can show that the soliton will follow a parabolic trajectory in z; for example the local center of mass of the soliton will be at a position $\propto z^2$. Consequently, the angle of propagation increases linearly as a function of z, where $n_1 x$ could be induced, for example, electro-optically if the externally applied electrical field has a gradient.

Before, the "useful" length of any electro-optical device is given by one diffraction length $\approx \pi D^2/(2\lambda)$. On physical grounds, if one allows for the soliton formation in the material that is used to deflect the beam, one effectively removes this limitation. However, since one has to use the same material to implement both effects, this imposes additional limitations, since a given material is likely not to be optimal for both purposes.

Fast light-deflection is highly desirable in all optical cross-connects in optical telecommunications today. Such functionality is crucial when one needs to shuffle signals coming from N incoming fibers, into N different outgoing fibers at will. The device that performs this task is known as an N-by-N switch or an N-by-N router. For some routing applications, speeds of the order of 1 ms are sufficient, but there are also particular cases where speeds of the order of 10 ns or faster are highly desirable. Currently, there are no satisfactory solutions available to perform such tasks when the number of ports, N, is large.

Another very important application for laser beam-deflection is in the field of 3D imaging. For many scientific, medical (in-body surgery), artistic (architecture), and entertainment purposes it would be highly desirable to have a way to present visual information in a true 3D setting. There are many hybrid technologies that partially fulfill this purpose such as holograms or various schemes in which the user needs to wear special glasses in order to perceive a 3D image. There exist proposals, partially implemented products, and even some commercially available solutions for the true 3D displays. One such solution involves filling the room with smoke, such as many dispersive particles. When a single laser beam propagates through such a medium, the scattering of light is not significant enough to be visible by a human eye; however, if many laser beams intersect at a single point, a human observer perceives a point light source at the point of the intersection of the laser beams. To construct a 3D image, one displays many such points in a 3D space at the same time. This way, a transparent, ghost-like, 3D image is created.

Another 3D imaging solution uses a material whose atomic transitions are chosen so that only a simultaneous excitation with two different invisible wavelength photons causes absorption into an electronic state, whose subsequent decay results in emission of a visible photon. The intersection point of two different laser beams of proper wavelengths is then observed by a human eye as a point light source at the point of the intersection. This technique also produces a transparent, ghost-like, image. However, one can then explore additional laser beams to make the medium absorbing in the 3D regions that are supposed to present a non-transparent part of the object; techniques of making an opaque medium transparent, and vice-versa are widely explored for example in the case of electro-magnetically induced transparency (EIT). At any rate, assuming a resolution of 500 points per dimension, and repetition rate of 24 frames per second, in order to implement either of the 3D imaging schemes described herein, one has to be able to address $24*500*500*500 \approx 10^9$ different points every second. Consequently, a beam-deflection speed of the order of 1 ns or faster is essential.

In addition to the two applications explained herein, there are many other applications where fast light deflection by an arbitrary angle would be highly beneficial. These involve: all-optical computing, fast laser printers, large-surface bright 2D displays (so called laser TVs), light shows, making masks for photo-litography, or the like.

Although the present invention has been shown and described with respect to several preferred embodiments thereof, various changes, omissions and additions to the form and detail thereof, may be made therein, without departing from the spirit and scope of the invention.

What is claimed is:

1. A device for bending a laser beam comprising:
   a beam deflection device that produces said beam having a selected number of addressable points; and
   a soliton forming mechanism being positioned at the output of said beam deflection device so it receives said beam and increases said number of addressable points by a certain magnitude.

2. The device of claim 1, wherein said soliton mechanism comprises a non-linear media.

3. The device of claim 2, wherein said non-linear media comprises a photonic crystal.

4. The device of claim 2, wherein said certain magnitude is greater than 100.

5. The device of claim 2, wherein said soliton mechanism comprises a length of 7.5 mm.

6. The device of claim 2, wherein said beam comprises a length of 5 μm.

7. The device of claim 2, wherein said beam comprises a diffraction length of 75 μm.

8. A method of bending a laser beam comprising:
   producing said beam having a selected number of addressable points with a beam deflection device; and
   positioning a soliton forming mechanism at the output of said beam deflection device so it receives said beam and increases said number of addressable points by a certain magnitude.

9. The method of claim 8, wherein said soliton mechanism comprises a non-linear media.

10. The method of claim 9, wherein said non-linear media comprises a photonic crystal.

11. The method of claim 9, wherein said certain magnitude comprises 100.

12. The method of claim 9, wherein said soliton mechanism comprises a length of 7.5 mm.

13. The method of claim 9, wherein said beam comprises a length of 5 μm.

14. The method of claim 9, wherein said beam comprises a diffraction length of 75 μm.

* * * * *